(12) United States Patent
Morizet et al.

(10) Patent No.: US 6,505,115 B2
(45) Date of Patent: Jan. 7, 2003

(54) DEVICE FOR CONTROLLING A SYSTEM FOR MONITORING THE ENVIRONMENT OF AN AIRCRAFT, IN PARTICULAR OF A TRANSPORT AIRCRAFT

(75) Inventors: Benoît Morizet, Toulouse (FR); Jean-Sébastien Vial, Colomiers (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/061,328

(22) Filed: Feb. 4, 2002

(65) Prior Publication Data

US 2002/0120393 A1 Aug. 29, 2002

(30) Foreign Application Priority Data

Feb. 26, 2001 (FR) .............................................. 01 02568

(51) Int. Cl.[7] .............................................. B64C 13/00
(52) U.S. Cl. ...................................... 701/120; 244/227
(58) Field of Search ................................. 701/120, 121, 701/122, 123; 340/951; 244/78, 226, 227, 221, 228

(56) References Cited

U.S. PATENT DOCUMENTS 4,019,702 A * 4/1977 Annin
4,373,184 A * 2/1983 Lambregts
4,394,999 A * 7/1983 Botzler
4,852,031 A * 7/1989 Brasington
5,265,827 A * 11/1993 Gerhardt

FOREIGN PATENT DOCUMENTS

WO          0101207        * 1/2001

\* cited by examiner

*Primary Examiner*—Richard M. Camby
(74) *Attorney, Agent, or Firm*—Stevens, Davis, Miller & Mosher, LLP

(57) ABSTRACT

The control device (1) comprises at least one first and one second control system (4, 5) which comprises control elements (A1 to A8, B1 to B6) actuable by an operator, so as to control the monitoring system (2). These first and second control systems (4, 5) are in interaction so that an actuation of a control element of one of the control systems (4, 5) automatically brings about an action on a control element of the other control system (5, 4) which is intended to control the same function (F1 to F6) in such a way as to bring it into a control state representative of the controlled state of this function (F1 to F6).

8 Claims, 1 Drawing Sheet

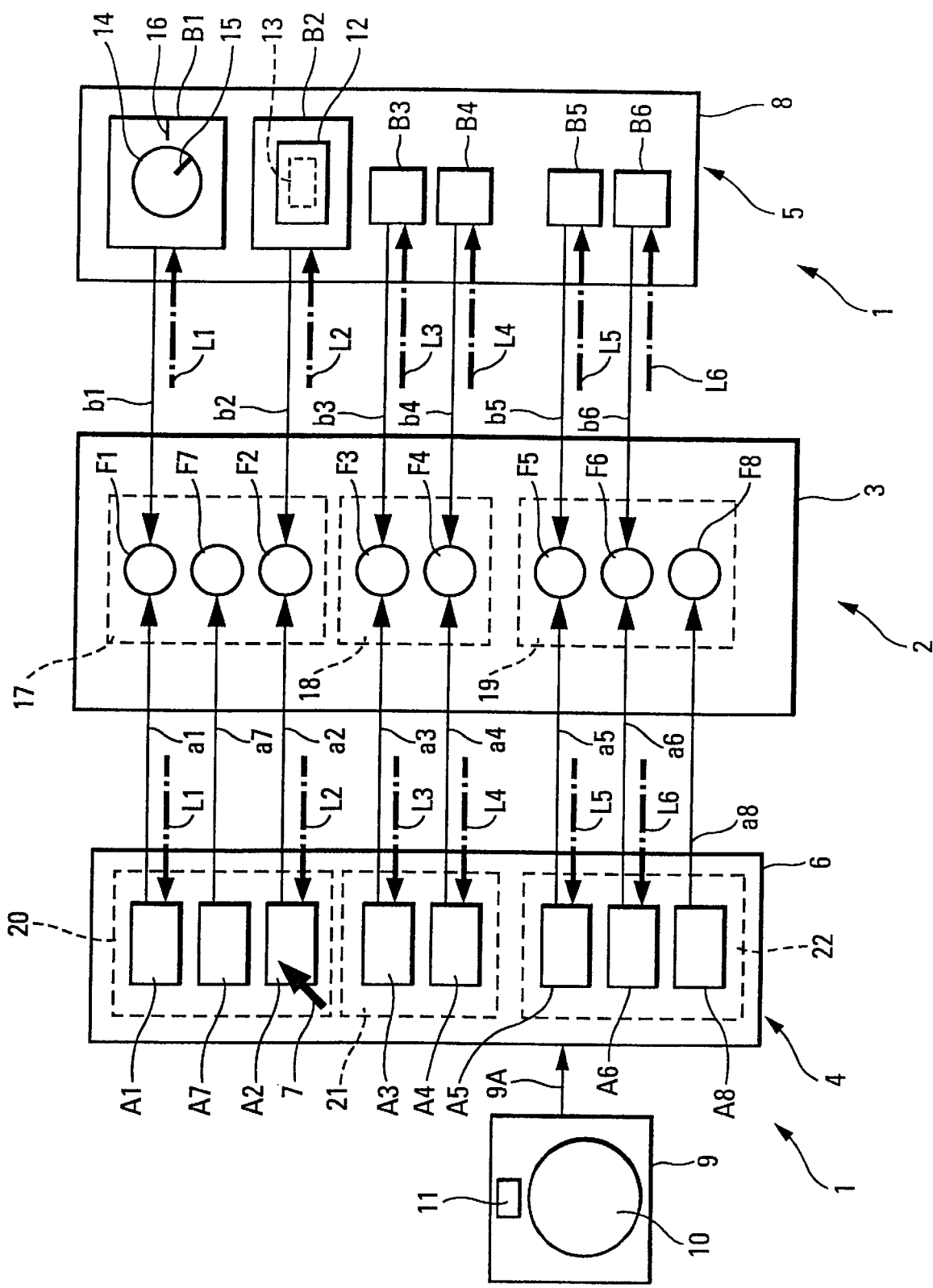

DEVICE FOR CONTROLLING A SYSTEM FOR MONITORING THE ENVIRONMENT OF AN AIRCRAFT, IN PARTICULAR OF A TRANSPORT AIRCRAFT

BACKGROUND OF THE INVENTION

The present invention relates to device for controlling a system for monitoring the environment of an aircraft, in particular of a transport aircraft.

DESCRIPTION OF THE PRIOR ART

Within the framework of the present invention, said monitoring system can relate in particular to at least one of the following known systems:
- a system of the TCAS type ("Traffic Collision Avoidance System") for monitoring air traffic in the environment of the aircraft, so as to prevent collisions;
- a system of the WXR type ("Weather Radar") for monitoring the weather; or
- a system of the TAWS type ("Terrain Awareness and Warning System") for monitoring the surrounding terrain.

One is aware that each of these known monitoring systems implements controllable functions, which pertain to the corresponding monitoring of the environment, that is to say which relate directly or indirectly to this monitoring. Moreover, each of these monitoring systems includes a control device comprising a plurality of control elements which are capable of being actuated by an operator, in particular a pilot of the aircraft, so as to control all the controllable functions of said monitoring system.

Generally, such a control device includes a particular hardware control system comprising a panel furnished with a plurality of hardware control elements, such as pushbuttons and lever-operated reversers in particular.

Such a control device exhibits a few drawbacks. In particular, when a control element of the aforesaid type is defective, it is no longer possible to control the function associated therewith, this of course being a great impediment and moreover possibly posing safety problems, in particular when this function relates directly to an important function, such as an anticollision function for example.

Moreover, such a control device is hardly adaptable, that is to say it cannot be easily tailored to the implementation of the control of new functions. Specifically, when installing new functions on the corresponding monitoring system, it is in particular necessary to replace the existing control panel with a new panel furnished with additional control elements tailored to these new functions and to modify the electrical leads accordingly, this of course being lengthy and expensive.

SUMMARY OF THE INVENTION

The present invention relates to a control device for controlling controllable functions relating to the monitoring of the environment of an aircraft, in particular a civil transport aircraft, which makes it possible to remedy the aforesaid drawbacks.

To this end, said control device comprising a first control system of a first type, comprising a plurality of control elements which are capable of being actuated by an operator, so as to control all said controllable functions, is noteworthy in that it furthermore comprises at least one second control system of a second type different from said first type, which comprises a plurality of control elements which are capable of being actuated by an operator, so as to control at least some of said controllable functions, and in that said first and second control systems are in interaction so that an actuation of at least one of the control elements of one of said control systems, so as to control one of said functions such as to bring it into a controlled state, automatically brings about an action, as the case may be on at least one control element of the other control system which is also intended to control this function, in such a way as to bring this control element into a control state which is representative of said controlled state of said function.

Thus, by virtue of the invention, when a control element of one of said control systems is faulty, the function which is associated with this faulty control element can still be controlled by the appropriate control element of the other control system. Consequently, the control device in accordance with the invention is especially reliable.

Furthermore, since the two control systems are systems of different types, the operator can choose the one which is most convenient for him, either throughout the flight, or temporarily as a function of the flight phases and/or conditions, thereby affording great flexibility of use and increasing the comfort of the operator in the execution of his tasks relating to the monitoring of the environment.

Moreover, by virtue of the interaction between the two control systems, that is to say of the reciprocal action between two control elements (respectively of each of said two control systems) associated with one and the same function, which makes it possible to bring the nonactuated control element into an appropriate control state, an operator can go indiscriminately and without difficulty, at any moment, from one system to the other, for example as a function of the urgency of the control, of the corresponding flight phase or of the position of the operator with respect to these two control systems. Moreover, as each control element is, by virtue of the invention, at any moment in a position representative of the controlled state of the associated function, the operator is always informed of the actual state of the controls and the various controls can always be effected with great precision.

Within the framework of the present invention, the two relevant control systems (or even more) may be of various known types. However, preferably, at least one of said control systems is:
- a software system comprising a screen furnished with responsive objects corresponding to said control elements, which are capable of being actuated indirectly by way of a known appropriate means, such as a mouse or a trackball for example. Such a software system is easily adaptable, that is to say new control elements can be easily added, through a simple tailoring of its software, without having to modify the architecture of said control system. It can therefore be tailored at very low cost, rapidly and easily, to new functions of the monitoring system; or
- a hardware system comprising manual control elements, which are capable of being actuated directly by an operator. Generally, such a control system is very robust and its standard type actuation is fully perfected by pilots.

In a preferred embodiment, said first control system is a software system, said second control system is a hardware system, and said second control system is intended to control only some of said controllable functions, preferably the functions which are considered to be the most important as regards the monitoring of the environment which is implemented.

The control device in accordance with this preferred embodiment of the invention exhibits, simultaneously, in particular the following advantages:

- it is reliable, by virtue of the presence of two control systems;
- at any moment it allows control with great precision indiscriminately by way of the two control systems, by virtue of the interaction between these two control systems;
- it is easily adaptable, by virtue of the characteristics of said software system; and
- it is robust, by virtue of the characteristics of said hardware system.

Additionally, advantageously, at least one of said manual control elements of said hardware system is intended to control a function with two states, which is capable of being activated and deactivated, and said hardware system comprises at least one indicator light which is associated with said control element and which:

- comes on automatically when said function is activated; and
- goes off automatically when said function is deactivated.

Moreover, advantageously, at least one of said manual control elements of said hardware system is intended to control a function capable of taking, on each occasion, one of a plurality of controlled states, and said control element comprises a rotary element, for example a rotary button, whose rotational position is representative of the controlled state of said function.

The present invention also relates to a system for monitoring the environment of an aircraft, comprising a plurality of controllable functions relating to the monitoring of the environment and a control device for controlling these controllable functions.

According to the invention, said monitoring system is noteworthy in that said control device is such as that mentioned above.

Preferably, said monitoring system comprises:

- three clusters of controllable functions, which are intended for the monitoring respectively of air traffic, the weather and the terrain; and
- a single control device for controlling these three clusters of controllable functions.

BRIEF DESCRIPTION OF THE DRAWING

The FIGURE of the appended drawing will clearly elucidate the manner in which the invention may be embodied. This single figure is a schematic diagram of a system for monitoring the environment of an aircraft, comprising a control device in accordance with the invention.

DESCRIPTION OF THE PREFERRED EMBODIMENTS

The control device 1 in accordance with the invention is intended for the control of a system 2 for monitoring the environment of an aircraft, in particular of a civil transport aircraft. This monitoring system 2, which is represented in the single figure of the drawing, is stowed onboard the aircraft and is intended for the monitoring of at least one parameter relating to the environment such as air traffic, the weather or the terrain for example, by way of monitoring means 3 specified hereinbelow.

In a known manner, said monitoring means 3 comprise standard controllable functions F1 to F8, which pertain to the monitoring implemented by these monitoring means 3. These may be:

- information functions intended to present information pertaining to the monitoring of the terrain, of the weather, of the traffic, . . . , and preferably presented in "visual" form (for example positions of the aircraft, etc.); and/or
- warning functions which result from calculations, based for example on the measured parameters (warning with respect to the terrain, etc.).

In a known manner, said monitoring system 2 comprises, in addition to the monitoring means 3, said control device 1 which comprises a control system 4, of a first particular type, furnished with a plurality of control elements A1 to A8. These control elements are intended to control respectively said controllable functions F1 to F8 of the monitoring means 3, as is illustrated by the links a1 to a8.

According to the invention, said monitoring devices 1 furthermore comprises at least one second control system 5 of a second type, different from said first type, which comprises a plurality of control elements B1 to B6 which are capable of being actuated by an operator, so as to control at least some F1 to F6 of said controllable functions F1 to F8 of the monitoring means 3, as is illustrated by links b1 to b6.

Moreover, according to the invention, said first and second control systems 4 and 5 are in interaction, as is illustrated by links L1 to L6 represented partially which link together in pairs respectively the control elements A1 to A6 and B1 to B6 of the two control systems 4 and 5, in such a way that an actuation of at least one of the control elements of one of said control systems 4, 5, so as to control one of said functions F1 to F8 such as to bring it into a controlled state (for example the actuation of the control element B2 of the system 5 so as to control the function F2) automatically brings about an action, as the case may be on at least one control element of the other control system which is also intended to control this function (in the example above, the control element A2 of the system 4) in such a way as to bring this control element (A2) into a control state which is representative of said controlled state of said function (F2).

Thus, by virtue of the invention, when a control element of one of said control systems 4, 5 is faulty (for example when the control element A5 of the system 4 is faulty), the function (F5) which is associated with this faulty element (A5) can still be controlled by the appropriate control element of the other control system (the control element B5 of the system 5 for this example).

Consequently, the control device 1 in accordance with the invention is particularly reliable. Of course, it is also conceivable for said control device 1 to comprise more than two control systems.

Furthermore, since the control systems 4 and 5 are systems of different types, the operator can choose the one which is most convenient for him, either throughout the flight, or temporarily as a function of the flight phases and/or conditions, thereby affording great flexibility of use and increasing the comfort of the operator in the execution of his tasks relating to the monitoring of the environment.

Moreover, by virtue of the interaction between the two control systems 4 and 5, that is to say of the reciprocal action between two control elements (respectively of each of said two control systems 4 and 5) associated with one and the same function, which makes it possible to bring the nonactuated control element into an appropriate control state, an operator can go indiscriminately and without difficulty, at any moment, from one system to the other, for example as a function of the urgency of the control, of the corresponding flight phase or of the position of the operator with respect to these two control systems 4 and 5.

Moreover, as each control element of the control device is at any moment in a position representative of the controlled state of the associated function, the various controls can always be effected with great precision.

Within the framework of the present invention, the two relevant control systems (or even more) may be of various known types. However, preferably, the control system 4 is a software system and comprises in the standard manner:

- at least one screen 6, preferably of the liquid crystal LCD type, on which are accessible the elements A1 to A8 which are responsive objects (points, zones, alphanumeric values, etc.) which can be designated, in particular by a cursor 7, and activated so as to control the implementation of the corresponding functions F1 to F8; and
- at least one actuation device 9 which is connected by a link 9A to the screen 6 and which comprises at least one means 10, for example a computer mouse or a trackball, allowing an operator to designate one of the elements A1 to A8, preferably by moving the cursor 7, and at least one means 11, for example a push-button, for enabling (that is to say for activating) an element A1 to A8 which is designated by the cursor 7.

This control system 4 of software type is easily adaptable, that is to say new control elements may be easily added, by a simple tailoring of its software, without having to modify its hardware architecture (actuation device 9, screen 6). This control system 4 can therefore be tailored at very low cost, rapidly and easily, to new functions of the monitoring system 2.

Additionally, the control system 5 is a hardware system comprising a control panel 8 furnished with manual control elements B1 to B6, which are capable of being actuated directly by an operator. Generally, such a control system 5 is very robust and its standard type actuation is fully perfected by pilots.

Moreover, according to the invention, this control system 5 is intended to control only some of the controllable functions F1 to F8 of the monitoring system 2, namely the functions F1 to F6 in the example represented in the figure. Preferably, the control is limited to the functions (F1 to F6) which are regarded as the most important (in particular those which are necessary in order to operate the monitoring system 2) as regards the monitoring of the environment which is implemented by said monitoring system 2. This makes it possible to reduce the footprint of said control system 5 and permits the addition of new functions to the monitoring system 2 without having to modify said control system 5, these new functions not being simply controllable by way of the hardware system 5, but only by way of the software system 4.

The control of a function F1 to F8 can be of two different types, namely:

- either having two states, corresponding respectively to an active state and an inactive state of the corresponding controlled function;
- or having a plurality of states, the corresponding controlled function possibly taking, in a continuous or stepwise manner, a plurality of different controlled states, for example different intensities in respect of the reception of an audible or visual signal.

In the first case, the manual control elements of the system 5 are preferably buttons 12, as represented for the element B2, which are furnished with an indicator light 13 preferably built-in. Depending on whether the corresponding function F2 is active or inactive, the indicator light 13 is (automatically) on or off.

On the other hand, in the second case, the manual control elements of the system 5 are preferably rotary buttons 14, as represented for the element B1, which are furnished with a marker 15 which co-operates with a fixed marker 16. According to the invention, the angular deviation between these two markers 15 and 16 varies as a function of the intensity or of the amplitude of the control of the corresponding function F1.

Of course, the control system 4 is also furnished with known means for depicting the aforesaid two types of control. For example, provision may be made:

- for a control having two states, the absence or the presence of a particular sign or of a highlighting of the screen 6; and
- for a control having a plurality of states, a signal with variable area, such as a barograph for example, on said screen 6.

In a preferred embodiment of the invention, the monitoring means 3 encompass several monitoring clusters 17, 18 and 19, each of said clusters 17, 18, 19 being intended to monitor a "parameter" or particular object. By way of illustration:

- the monitoring cluster 17 can be of the aforesaid TCAS type, which is intended for monitoring air traffic;
- the monitoring cluster 18 can be of the aforesaid WXR type, which is intended for monitoring the weather; and
- the monitoring cluster 19 can be of the aforesaid TAWS type, which is intended for monitoring the terrain.

In this preferred embodiment, all the controls of these various monitoring clusters 17, 18 and 19 have been grouped together on one and the same control device 1, thereby easing the supervision and control of these clusters 17, 18 and 19 and reducing the footprint.

In this case, the control elements A1 to A8 of the system 4 can be grouped together on various pages 20, 21 and 22 which are intended for the control respectively of said clusters 17, 18 and 19. These pages 20 to 22 may be called, in the standard manner, by way of a menu.

Another distribution of the objects of the various pages 20 to 22 is of course also possible within the framework of the present invention.

What is claimed is:

1. A control device for controlling controllable functions relating to the monitoring of the environment of an aircraft, in particular of a transport aircraft, said control device comprising:

a first control system of a first type, comprising a plurality of control elements which are capable of being actuated by an operator, so as to control all of said controllable functions, and at least one second control system of a second type different from said first type, which comprises a plurality of control elements which are capable of being actuated by an operator, so as to control at least some of said controllable functions, wherein said first and second control systems are in interaction so that an actuation of at least one of the control elements of one of said control systems so as to control one of said functions such as to bring it into a controlled state, automatically brings about an action, as the case may be, on at least one control element of the other one of said control systems which is also intended to control said one of said functions, so as to bring this control element into a state which is representative of said controlled state of said one of said functions.

2. The control device as claimed in claim 1, wherein one of said control systems is a software system comprising a screen furnished with responsive objects corresponding to said control elements, which are capable of being actuated indirectly by way of an appropriate means.

3. The control device as claimed in claim 1, wherein one of said control systems is a hardware system comprising manual control elements, which are capable of being actuated directly by an operator.

4. The control device as claimed in claim 1, wherein said first control system is a software system, said second control system is a hardware system, and said second control system is intended to control only some of said controllable functions.

5. The control device as claimed in claim 3, wherein at least one of said manual control elements of said hardware system is intended to control a function with two states, which is capable of being activated and deactivated, and said hardware system comprises at least one indicator light which is associated with said at least one of said manual control elements and which:

- comes on automatically when said function with two-states is activated; and
- goes off automatically when said function with two-states is deactivated.

6. The control device as claimed in claim 3, wherein at least one of said manual control elements of said hardware system is intended to control a first function capable of taking, on each occasion, one of a plurality of controlled states, and said at least one of said manual control elements comprises a rotary element, whose rotational position is representative of the controlled state of said first function.

7. A system for monitoring the environment of an aircraft, comprising a plurality of controllable functions relating to the monitoring of the environment and a control device for controlling said controllable functions, wherein said control device is of the type of that specified under claim 1.

8. The monitoring system as claimed in claim 7, which system comprises:

- three clusters of controllable functions, which are intended for the monitoring respectively of air traffic, weather and terrain; and
- a single control device for controlling said three clusters of controllable functions.

* * * * *